United States Patent
Kawano et al.

[11] Patent Number: 5,822,597
[45] Date of Patent: Oct. 13, 1998

[54] POWER MANAGEMENT APPARATUS AND METHOD FOR AN INFORMATION PROCESSING SYSTEM

[75] Inventors: Seiichi Kawano; Kohsuke Ohtani, both of Sagamihara; Tomoki Maruichi, Yamato; Yasunori Maezawa, Sagamihara; Takashi Oshiyama, Fujisawa, all of Japan

[73] Assignee: International Business Machines Corp., Armonk, N.Y.

[21] Appl. No.: 652,201

[22] Filed: May 23, 1996

[30] Foreign Application Priority Data

Jun. 22, 1995 [JP] Japan ................................ 7-155708

[51] Int. Cl.$^6$ .......................................... G06F 1/32
[52] U.S. Cl. .......................................... 395/750.05
[58] Field of Search ........................... 395/750, 750.03, 395/750.05, 750.06; 364/707

[56] References Cited

U.S. PATENT DOCUMENTS

| | | | |
|---|---|---|---|
| 5,396,635 | 3/1995 | Fung | 395/800 |
| 5,416,726 | 5/1995 | Garcia-Duarte et al. | 364/550 |
| 5,504,907 | 4/1996 | Stewart et al. | 395/750 |
| 5,532,935 | 7/1996 | Ninomiya et al. | 364/492 |
| 5,617,572 | 4/1997 | Pearce et al. | 395/750 |

OTHER PUBLICATIONS

Patent Abstracts of Japan, Publication #05224787, Publication date; Mar. 9, 1993, Applicant: Hitachi Ltd.

*Primary Examiner*—Glenn A. Auve
*Attorney, Agent, or Firm*—George E. Grosser

[57] ABSTRACT

A information processing system which enters power management mode when a predetermined time has elapsed since a last user input (or a last processing operation), adjusts the predetermined time according to the action of the operator in response to entering the power mode. If the user transfers back to normal mode quickly the predetermined reference time is increased. If the user responds only after a delay period the predetermined reference time is decreased. By so adjusting the predetermined time a better balance is achieved between energy saving and user convenience for a current level of operator attention to the computer.

4 Claims, 5 Drawing Sheets

POWER MANAGEMENT APPARATUS AND METHOD FOR AN INFORMATION PROCESSING SYSTEM

Applicants claim the foreign priority benefits under 35 U.S.C. I 119 of Japanese Application Serial No. 7-155708, which was filed Jun. 22, 1995. This Japanese application and its translation are incorporated into this application by reference.

FIELD OF THE INVENTION

The present invention relates to an information processing system, such as a personal computer, and to a control method therefor; and in particular to an information processing system that has a power management function for reducing or halting the power supply to electric circuits and to a control method therefor. More specifically, the present invention pertains to an information processing system that can enter power management mode in accordance with an optimal timer count, and a control method therefor.

BACKGROUND OF THE INVENTION

As progress in the current technique continues, various types of personal computers (hereafter referred to as "PCS" or "systems"), such as desktop, laptop and notebook computers, are being manufactured and sold. The notebook PCS that are being manufactured are compact and light, since for their design, portability and outdoor use are taken into consideration.

One of the features of notebook PCS is that they can be driven by an incorporated battery. The notebook PCS may be used at sites where there are no commercially available power sources. A battery that is incorporated in a notebook PC is commonly formed as a "battery pack," which is a package comprising a plurality of rechargeable battery cells, such as Ni—Cd, NiMH, or Li-Ion. Although such a battery pack is rechargeable, the duration (battery life) reaches, at most, two to three hours for the system operation time. Another possible feature of the notebook PCS is that various ideas for power management are taken to extend the battery life.

Power saving of PCS can be realized not only by reducing the power that is consumed by the individual electric circuits, but also by reducing or halting, as needed, the power supply to electric circuits (or peripheral devices) when they enter low power consumption states. The latter method can especially be called "Power Management." The power management modes for the PC are "LCD backlight-off" mode and "HDD-of" mode, which halts the power supply to the backlight of an LCD (Liquid Crystal Display) and to an HDD (Hard Disk Drive). The reason is these two components account for the greatest share of the total power consumption for an entire system. The other examples of the power management are "MPU speed slow-down" mode, in which the clock speed of an MPU (Micro Processing Unit) is reduced; "Suspend*" mode, in which the power supply to all the electric circuits, except for a main memory, is halted; and "Hibernation*" mode, in which the supply of power to all the electric circuits including the main memory is halted. In order to enter these power management modes at the appropriate timing, the system has an LCD backlight-off timer, an HDD-off timer, an MPU speed slow-down timer, a suspend timer, and a hibernation timer (hereafter generally referred to as a "power management timer" or simply as a "timer"). When a time predetermined by the power management timer has elapsed since the last user input via keyboard/mouse (or the last disk access for the HDD), or in response to the instruction by a user (e.g., the depression of a predetermined function key or the selection (double clicking) of a "suspend icon"), the system enters to a designated power management mode. When a given key input or an arbitrary key input is entered by a user during the power management mode, the system halts the power managing operation and begins again to supply power to corresponding electric circuits and peripheral devices so that it resumes a task at a point immediately before entering the power management mode.

At present, the demand for power management is increasing even for desktop PCS to which power can be supplied almost endlessly by commercially available power sources. The U.S. Environmental Protection Agency (EPA) advocates the energy saving action that is called the "Energy Star" program, and recommends that a power management function shall be provided for desktop PCS too. For example, the PS/55E ("Green PC" as a common name) that is sold by IBM Japan, Ltd., has a suspend function. The IBM PC 750 and Aptiva series support a FAX function, and also a rapid resume function for the purpose of saving power consumption in the standby state until data reception.

It may be obvious that the waiting period before the power management operation begins (i.e., the time set at the power management timer) should be short to provide great power saving effect. However, if the mode transition starts too early, useability (or operability) may be damaged because the power management operation halts a task that is being executed by the system.

When the power management operation occurs against user's will, the user tends to perform an operation (e.g., a key input) to instruct the recovery to normal mode within a relatively short period of time since the mode transition. However, such input operation urging the recovery to the normal mode is troublesome for a user. In addition, once the power supply is halted, a certain period of additional delay time is required for the recovery to the normal operating state. This delay time varies, depending on the peripheral devices affected. For an LCD backlight, 100 msec is required, and for an HDD, 2.7 to 15 msec is required. The recovery of the clock speed of the MPU also depends on how much the speed was reduced. To return, for example a chip such as Pentium sold by Intel Corp. which is operated at high speed of about 100 MHZ, from the completely halted state to the state with the full clock rate, approximately 1 msec is required in order to stabilize a PLL circuit. To recover from the suspend mode or the hibernation mode, a considerable period of delay time is required because data that are stored in the main memory or the HDD must be restored again. When recovering from is the suspend mode or the hibernation mode, a password may be required in order to secure the confidentiality in the system. The input operation of a password is more troublesome for a user when entering the power management modes against his will.

When the system enters power management mode upon user's will, as the mode transition is performed upon the key input, at the discretion of the user, the delay time required for the resumption of a task may be ignored by the user. On the other hand, when the system automatically begins the power management operation by using the power management timer, the power management operation is sometimes not expected by user, i.e., there may be deterioration of useability.

One of countermeasures, to avoid starting the power management operation against user's will, is to use the more optimized time out value for the power management timer. For currently sold PCS, however, the time out value for the power management is being fixed before the shipment, or kept merely programmable by user. These time out value thus provided are merely static. Work habits vary, depending on users; with some users requiring a long interval for each input operation (e.g., a period of time during which the user is thinking while looking at the screen), and other users requiring only a short interval. If the power management timer retains the static property, it can't cope with various work habits. The time out value of the power management timer must be set to be relatively large value in order to avoid irritating users with any work habits by interrupting the task accompanied by the mode transition. If the time out value is set too long, however, a wasteful period for the power supply may deteriorate the power management effect.

That is, a trade-off relationship may exist between power management and useability. If the time out value of the power management timer is provided statically, this does not provide the adaptability to versatile work habits that individual users may have, and can't exactly respond to the requests for both the power management and useability.

"Suspend" more specifically means to halt the power supply to almost all the electric circuits, except for a main memory in which the necessary data (hardware context data, such as the I/O setup state and the status of an MPU, and the contents of a VRAM) are stored. "Hibernation" in contrast, means to halt the power supply to all the electric circuits including a main memory after saving the necessary data (hardware context data, the contents of a VRAM, and data in the main memory) on an HDD. The recovery operation from the suspend mode or the hibernation mode can be performed, in the reverse sequence, by starting the power supply to the individual electric circuits and restoring the saved data to its original locations. As a result, the task can be begun at a point immediately before the mode transition. The recovery from the suspend mode is called "Resume," and the recovery from the hibernation mode is called "Wake up."

Accordingly, a feature of the present invention is to provide an information processing system that has a power management function for reducing or halting the power supply electric circuits, and to a control method therefor.

It is an additional object of the present invention to provide an information processing system that can enter power management mode using a time out value, which is unlikely to cause a user's job to be interrupted against his will, and to a control method for selecting such a time out value.

SUMMARY OF THE PRESENT INVENTION

According to a first aspect of the present invention, provided are an information processing system of the type which has a timer to enter power management mode when a time predetermined by a power management timer has elapsed since a last user input (or a last processing operation), characterized in that the timer alters the time predetermined by the power management timer in accordance with a time interval that extends from a point entering the power management mode to a next user input (or a next processing operation) that urges the recovery to normal mode, and a control method therefor.

According to a second aspect of the present invention, provided are an information processing system of the type which enters power management mode when a time predetermined by a power management timer has a elapsed since a last user input (or a last processing operation), comprising: means for measuring a time interval that extends from a point entering the power management mode to a next user input (or a next processing operation) that urges the recovery to normal mode; means for comparing the time interval with a reference value that is predetermined; and means for altering the time predetermined by the power management timer to a smaller value when the time interval is greater than the reference value, and a control method therefor.

According to a third aspect of the present invention, provided are an information processing system of the type which enters power management mode when a time predetermined by a power management timer has elapsed since a last user input (or a last processing operation), comprising: means for measuring a time interval that extends from a point entering the power management mode to a next of user input (or a next processing operation) that urges the recovery to normal mode; means for comparing the time interval with a reference value that is predetermined; and means for altering the time predetermined by the power management timer to a greater value when the time interval is smaller than the reference value, and a control method therefor.

According to a fourth aspect of the present invention, provided are an information processing system of the type which enters power management mode when a time predetermined by a power management timer has elapsed since a last user input (or a last processing operation), comprising: means for measuring a time interval that extends from a point entering the power management mode to a next user input (or a next processing operation) that urges the recovery to normal mode; means for comparing the time interval with a reference value that is predetermined; and means for altering the time predetermined by the power management to a smaller value when the time interval is greater than the reference value, or to a greater value when the time interval is smaller than the reference value, and a control method therefor.

According to a fifth aspect of the present invention, an information processing system comprises: a processor, a memory; first means for providing a signal for a constant interval of time, a power management timer for reporting that a predetermined time has elapsed since a last user input (or a last processing operation); second means for starting power management operation in response to a report from the power management timer; third means for halting the power management operation upon receipt of a next user input; fourth means for measuring elapsed time that from a point entering the power management operation to a point halting the power management operation; and fifth means for altering the predetermined time of the power management timer in accordance with the elapsed time from a point entering the power management operation to a point halting the power management operation. The fifth means may compare the elapsed time, from a point entering power management operation to a point halting the power management operation, with a reference value that is predetermined, and may alter the predetermined time to a smaller value than the set time interval for the power management timer when the elapsed time is greater than the reference value, or alter the predetermined time to a greater value when the elapsed time is smaller than the reference value.

According to a sixth aspect of the present invention, provided are an information processing system of the type which has a timer to enter power management mode when a time predetermined by a power management timer has elapsed since a last user input (or a last processing operation), characterized in that the timer alters the time predetermined by the power management timer in accordance with a time interval that extends from a point starting the power supply to a point entering the power management mode, and a control method therefor.

According to a seventh aspect of the present invention, provided are an information processing system of the type which enters power management mode when a time predetermined by a power management timer has elapsed since a last user input (or a last processing operation), comprising: means for measuring a time interval that extends from a point starting the power supply to a point entering the power management mode; comparing the time interval with a reference value that is predetermined; and means for altering the time predetermined by the power management timer to a smaller value when the time interval is greater than the reference value, and a control method therefor.

According to an eighth aspect of the present invention, provided are an information processing system of the type which enters power management mode when a time predetermined by a power management timer has elapsed since a last user input (or a last processing operation), comprising: means for measuring a time interval that extends from a point starting the power supply to a point entering the power management mode; means for comparing the time interval with a reference value that is predetermined; and means for altering the time predetermined by the power management timer to a greater value when the time interval is smaller than the reference value, and a control method therefor.

According to a ninth aspect of the present invention, provided are an information processing system of the type which enters power management mode when a time predetermined by a power management timer has elapsed since a last user input (or a last processing operation), comprising: means for measuring a time interval that extends from a point starting the power supply to a point entering the power management mode; means for comparing the time interval with a reference value that is predetermined; and means for altering the time predetermined by the power management timer to a smaller value when the time interval is greater than the reference value, or to a greater value when the time interval is smaller than the reference value, and a control method therefor.

According to a tenth aspect of the present invention, an information processing system comprises: a processor; a memory; first means for providing a signal for a constant interval of time; a power management timer for reporting that a predetermined time has elapsed since a last user input (or a last processing operation); second means for starting a power management operation in response to a report from the power management timer; third means for halting the power management operation upon a next user input; fourth means for measuring elapsed time from a point halting the power management operation to a point re-starting the power management operation; and fifth means for altering the predetermined time of the power management timer in accordance with a result of a measurement by the fourth means. The fifth means may compare a measured time by the fourth means with a reference value that is predetermined, and may alter the predetermined time of the power management timer to a smaller value when the measured time is greater than the reference value, or to a greater value when the measured time is smaller than the reference value.

The first through the fifth aspects of the present invention arose from the observation that, normally, a user tends to recover to normal mode within a relatively short period of time after entering the power management if the mode transition is against his will. That is, according to an information processing system and a control method therefor of these aspects, when a next user input (or a next processing operation) occurs relatively early following the mode transition to the power management mode, it is assumed that a user probably feels that the time out value of a power management timer is too short to operate, and the time out value of the power management timer is altered so that the next time it is longer. When the period from the point entering power management mode to a next user input (or a next operation) is long enough, the mode transition to the power management mode is assumed to be too long, and since the mode transition should be occurred rather earlier, the time out value of the power management timer is shortened the next time. As the power management timer is altered dynamically, the job of a user is not interrupted against his will, and the power management effect can be increased.

The sixth through the tenth aspects are provided according to the experimental rule that, when a time interval from a point starting the power supply to a point entering the power management mode is too long, the next one job, such as the next key input operation or an access of an HDD, is likely to be terminated early (because a user is tired from the continual data input and thus tends to quit the following job earlier). More specifically, with an information processing system and a control method therefor according to these aspects, when the input job by a user continues for a relatively long period of time so that period until the power management operation is long enough, the time predetermined by the power management timer for the next time is shortened. Since a subsequent input job tends to involve a shorter period of time when a user is tired, it is less probable that a user will be irritated by an early entry into the power management mode, and the power management effect is increased.

That is, the present invention concerns the learning of the work habits of a user and the dynamic alteration of a power management timer. Therefore, it is possible to substantially improve the total performance of the system, while maintaining a balance between useability and power management.

Other objects, features and advantages of the present invention will become readily apparent during the following detailed explanation for an embodiment that is given while referring to the accompanying drawings.

DESCRIPTION OF THE PREFERRED EMBODIMENT

One embodiment of the present invention will now be described in detail while referring to the drawings.

A. Hardware Arrangement of Personal Computer (PC) 100

Figure 1:
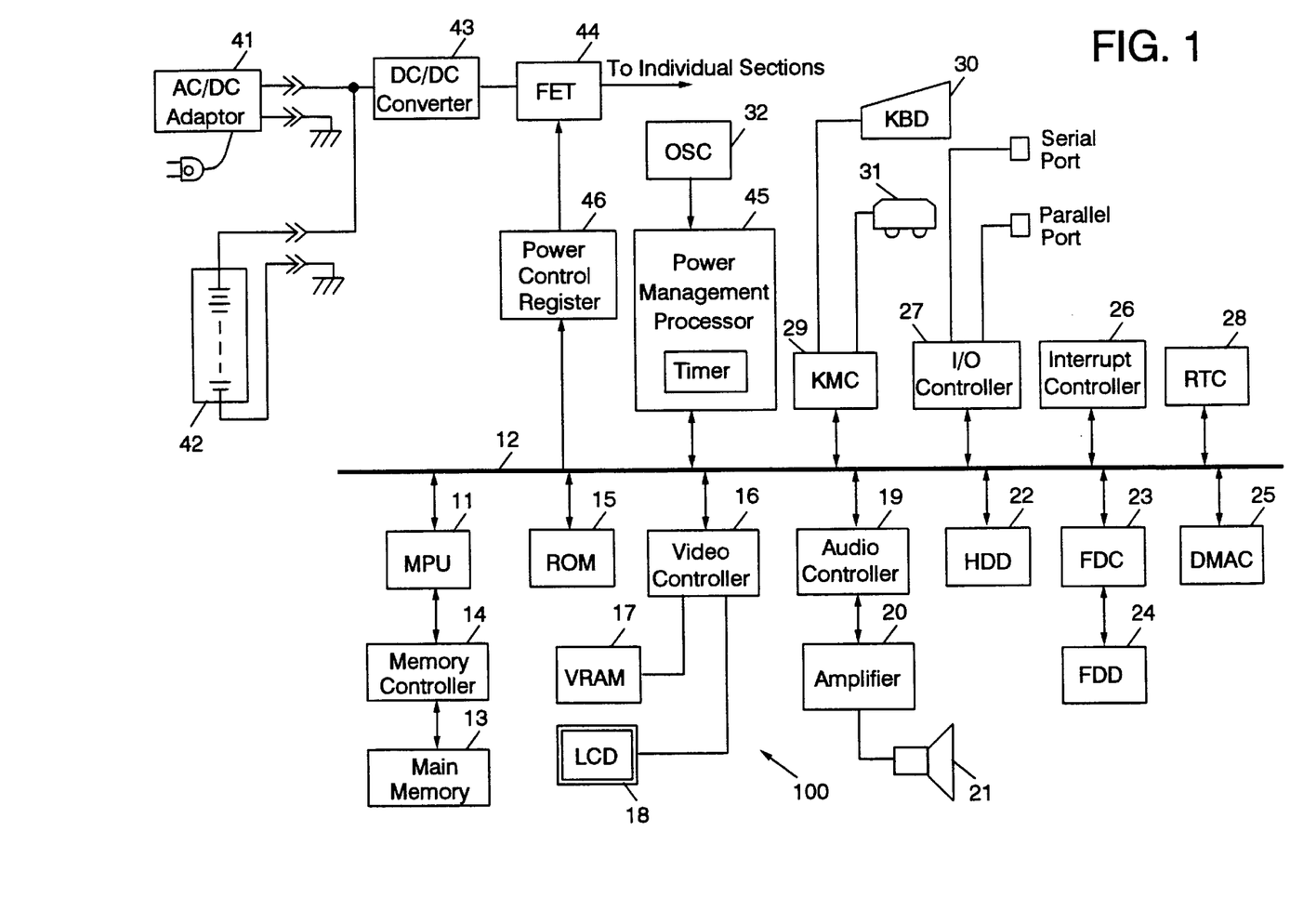
FIG. 1 is a schematic diagram illustrating the hardware arrangement of a personal computer (PC) 100 according to one embodiment of the present invention.

FIG. 1 is a diagram illustrating the hardware arrangement of a personal computer (PC) 100, according to one embodiment of the present invention.

In the PC 100, a MPU (Micro Processing Unit) 11 that serves as a main controller executes various programs under the control of an operating system (OS). The MPU 11 communicates with the individual hardware elements across a common signal transfer path (also called a "bus") 12 that consists of data signal lines, address signal lines, and control signal lines.

A main memory 13 is a volatile memory (RAM) that is employed to load the programs (OS and application programs: see the division C) that are executed by the MPU 11, and that serves as a work area for the MPU 11. Dynamic RAM (DRAM), with which the construction of a relatively great memory capacity is available at a low price, can be used as the main memory 13. A memory controller 14 controls the access to the main memory 13. A ROM 15 is a nonvolatile memory for which written data are predetermined during the manufacturing process, and is employed to semi-permanently store a coded test program which is performed at the time of activation of the system 100 (POST), and programs for controlling hardware components of the system 100 (BIOS).

A video controller 16, which is a peripheral controller for actually handling a drawing command from the MPU 11, first writes the processed drawing data into a screen buffer (VRAM) 17, and then reads the drawing data from the VRAM 17 and outputs the data to a liquid crystal display device (LCD) 18. An audio controller 19 is a peripheral controller for processing the input/output of an audio signal. An audio signal that is generated by the audio controller 19 is amplified by, (for example), an amplifier 20 and the amplified signal is outputted through a loudspeaker 21.

A hard disk drive (HDD) 22 and a floppy disk drive (FDD) 24 are so-called auxiliary storage devices (direct access storage devices: DASDs). A floppy disk controller (FDC) 23 is an FDD driving controller. The HDD 22 includes an HDD-off timer. When a time predetermined by the HDD-off timer has elapsed since a last disk access, an interrupt is generated on the bus 12 and the occurrence of the interrupt is reported to the MPU 11 (more specifically, to a BIOS that handles an interrupt).

A DMA (Direct Memory Access) controller 25 is a peripheral controller for controlling data transfer operation between the main memory 13 and the peripheral device (e.g., the FDD 24) without the involvement of the MPU 11. An interrupt controller 26 constantly monitors the bus 12. When interrupt controller 26 detects the occurrence of an interrupt, it reports this to the MPU 11 (more specifically, to a BIOS that handles such an interrupt).

A real time clock (RTC) 28 is a device for measuring a real time at which a signal having a constant cycle is generated. The system 100 has a function for time-stamping the time at the RTC 28 in a predetermined area of the main memory 13. With this function, a time interval between the occurrence of two phenomena (e.g., an interval from a point entering power management mode to a point returning to normal mode) can be calculated. The RTC 28 is backed up by a coin battery (not shown) and can continue counting the real time even while the system 100 is powered down.

An I/O controller 27 is a peripheral controller for controlling the data input/output, which is performed with an external device (such as a modem or a printer) via a serial port or a parallel port. A keyboard/mouse controller (KMC) 29 transmits to the MPU 11 the scan code data inputted via a keyboard (KBD) 30 or the coordinate value pointed by a mouse 31.

An oscillator (OSC) 32 provides a clock signal to a device, such as a power management processor 45 (which will be described later) or the MPU 11, that is synchronously operated or that has a timer function.

The system 100 is driven by the power supply from an external commercially available power source, which is obtained via an AC/DC adaptor 41, or from an incorporated battery pack 42. The output voltages of the power sources 41 and 42 are sent in parallel to a DC/DC converter 43. The DC/DC converter 43 drops these voltages to levels that are appropriate for driving the system 100 (e.g., 5 V and 3.3 V), and outputs it to the system 100. The control of the power supply are performed by the closing and the opening of an FET switch 44. The gate terminal of the FET switch 44 is electrically connected to a corresponding bit cell in a power control register 46.

The power management processor 45 is a peripheral controller that is provided mainly to manage the power supply to the individual sections in the system 100, and is preferably a one chip controller IC "330/H8" that is manufactured by Hitachi Ltd. This IC includes a 16-bit CPU, a RAM, a ROM, a timer, eight analog input pins and 16 digital input/output pins, and its functions are programmable. The power management processor 45 in this embodiment communicates with the individual sections via the bus 12, so that it can monitor the user input operation by using the keyboard 30 and the mouse 31, and the operating conditions of the system 100. The power management processor 45 can rewrite the contents of the bit cells in the power control register 46 (see the division B). The power management processor 45 also performs the functions of power management timers, such as an LCD-off timer, an MPU speed slow-down timer, a suspend timer, and a hibernation timer. Each time predetermined for each power management timer has elapsed since a last user access, an interrupt is generated across the bus 12.

Almost all the PCs that are currently sold have the hardware components equivalent of the blocks 11 through 32. Although many other hardware components are needed to constitute a PC, this is obvious to one having ordinary skill in the art, and to simplify the description, no explanation for them will be given in this specification.

In this embodiment, the functions of the LCD-off timer, the suspend timer and the hibernation timer are provided by the power management processor 45, and the functions of the HDD-off timer is provided within the HDD 22. Such an arrangement in which hardware blocks these power management timers are located is merely a matter of design.

B. Power Supply System for Personal Computer (PC) 100

Figure 2:
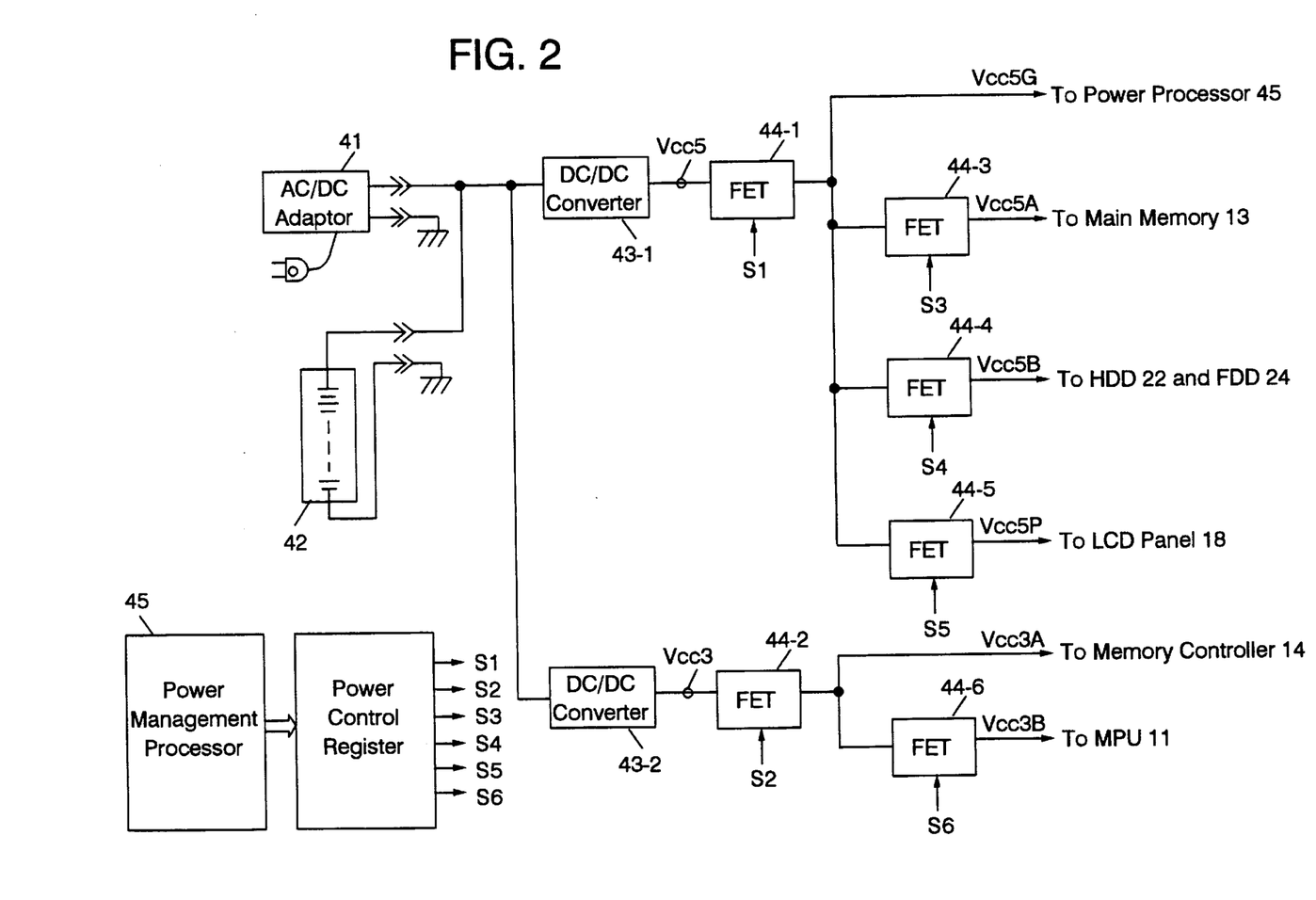
FIG. 2 is a specific diagram illustrating the power supply system of the PC 100.

FIG. 2 is a specific diagram showing a power supply system for the PC 100 according to the embodiment of the present invention.

The DC/DC converter 43, which is shown as a single block 43 in FIG. 1 is actually constituted by two blocks: a DC/DC converter 43-1 for supplying a voltage of 5 V and a DC/DC converter 43-2 for supplying a voltage of 3.3 V. In correspondence with the DC/DC converters 43-1 and 43-2, the FET switch 44 in FIG. 1 is actually constituted by six FET switches 44-1 through 44-6.

A power feed line $V_{CC5}$, that extends from the DC/DC converter 43-1 is branched via the FET switch 44-1 to provide four sub-power feed lines $V_{CC5G}$, $V_{CC5A}$, $V_{CC5B}$ and $V_{CC5P}$. The sub-power feed line $V_{CC5G}$ is connected to the power management processor 45, etc.; the $V_{CC5A}$ is connected to the main memory 13; the $V_{CC5B}$ is connected to the DASD (such as the HDD 22 and the FDD 24); and the $V_{CC5P}$ is connected to the LCD panel 18. The FET switches 44-3, 44-4, and 44-5 are inserted between the sub-power feed lines $V_{CC5G}$, $V_{CC5A}$, $V_{CC5B}$, and $V_{CC5P}$, and the supplied power destinations in order to halt the power supply.

A power feed line $V_{CC3}$ that extends from the DC/DC converter 43-2 is branched via the FET switch 44-2 to provide two sub-power feed lines $V_{CC3A}$ and $V_{CC3B}$. The sub-power feed line $V_{CC3A}$ is connected to the memory controller 14 and the $V_{CC3B}$ is connected to the MPU 11, etc. The FET switch 44-6 is inserted between the sub-power feed line $V_{CC3B}$ and the supplied power destination in order to halt the power supply.

The gate terminals of the six FET switches 44-1 through 44-6 are electrically connected to corresponding bit cells in the power control register 46. The power management processor 45 sets or resets the bit cells in the power control register 46 via the bus 12 to control the power supply for each sub-power feed line.

By referring to the above explanation, it would be easily understood that the personal computer having the power supply system as shown in FIG. 2 can perform power management operations, such as an LCD-off, an HDD-off, and a suspend operation (for example, for the LCD-off operation, the FET switch 44-5 may be turned off, and for the suspend operation, the FET switches, other than the switches 44-1 and 44-3, may be turned off).

The technique that relates to the power management processor 45 and the power control register 46 is also well known. A hardware block that is the equivalent of the power management processor 45 and the power control register 46 is described in, for example, the specifications for Japanese Patent Application No. Hei 04-54955 (Japanese Unexamined Patent Publication No. Hei 05-289784: our company reference No. JA9-92-004) and for Japanese Patent Application No. Hei 05-184186 (Japanese Unexamined Patent Publication No. Hei 07-84848: our company reference No.: JA9-93-020). In addition, the IBM ThinkPads 700C/750/755 that are sold by IBM Japan, Ltd., include hardware components that are the equivalent of the components 45 and 46.

C. Software Arrangement of Personal Computer (PC) 100

Figure 3:
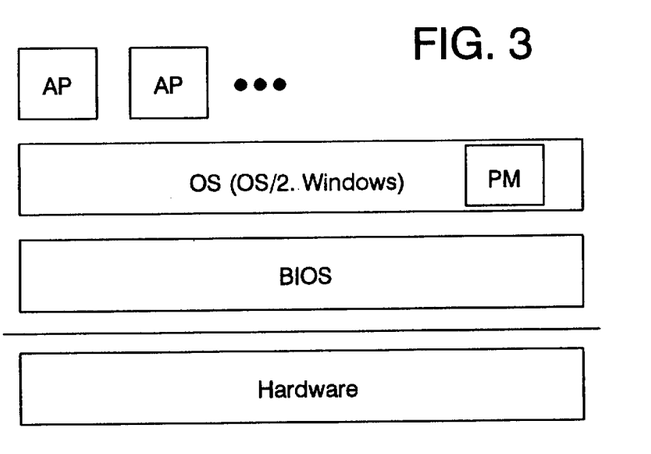
FIG. 3 is a schematic diagram illustrating the hierarchical software system that can be employed by the PC 100 according to the embodiment of the present invention.

FIG. 3 is a schematic diagram illustrating the hierarchical software arrangement that can be employed by the PC 100 according to the embodiment of the present invention.

The software in the lowest layer is a BIOS (Basic Input/Output System). The BIOS is a program group which includes a collection of basic operation commands for controlling the hardware components (such as the video controller 16, the keyboard 30, the HDD 22 and the FDD 23) in the system 100, and is coded and stored in the ROM 15. The BIOS also has functions for the handling of interrupt requests that are generated on the bus 12.

An operating system (OS) is basic software for the total management of the hardware and the software of the system 100, and provides file management, memory management, task management and data input/output management, and a user interface (a system command and a system call) for handling a screen display and the manipulation of a mouse. OS/2 (a trademark of IBM Corp.) and Windows (a trademark of Microsoft Corp.), for example, correspond to the operating system. The operating system in this embodiment includes, as one module, a PM (power management) program for executing a power management operation (see the division D).

In the topmost layer are application programs (APs). Programs for word processing, databases, calculation for tables, and communication correspond to these application programs. The application programs are loaded as needed from the auxiliary storage device, such as the HDD 19 or the FDD 20, into the main memory 13 as desired by a user.

D. Power Management Operation of Personal Computer (PC) 100

The hardware and software arrangements of the computer system 100 that embodies the present invention have been explained in the above divisions. In this division, the procedure of the present invention will be explained by using an example where the system 100 may enter suspend mode and resume normal operation.

D-1. Suspend/resume routine

Figure 4:
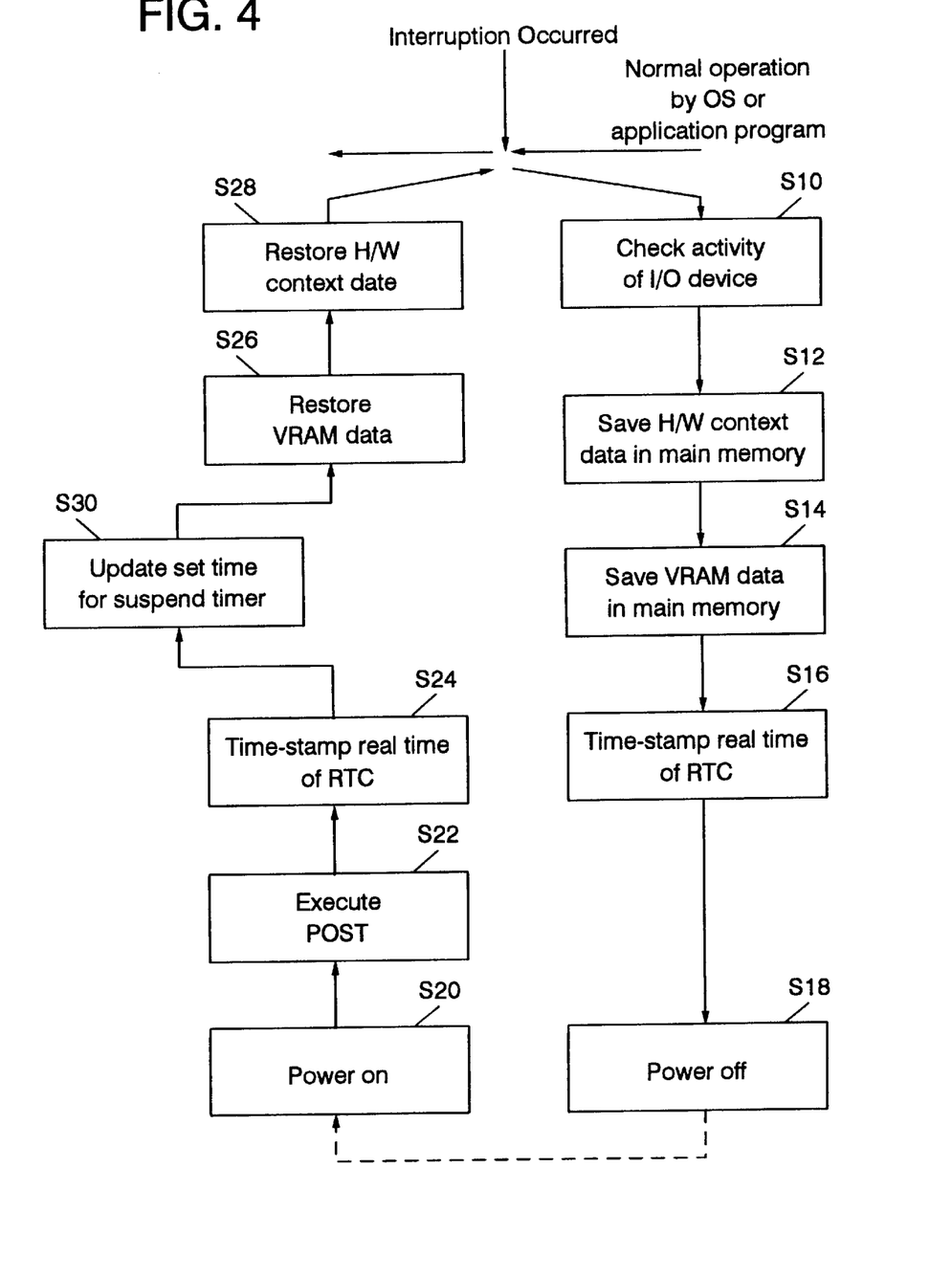
FIG. 4 is a flowchart showing a suspend routine and a routine (resume routine) for returning from a suspend mode and resuming a task.

FIG. 4 is a flowchart showing a routine (suspend routine) for entering suspend mode and a routine (resume routine) for recovering from the suspend mode and restarting a task.

(1) Suspend routine

During the normal operation, the power management processor 45 monitors the user input via the keyboard 30 or the mouse 31, and the operating state of the system 100. When an internal suspend timer detects that a predetermined time ($T_{SUS}$) has elapsed since a last user input, or a last processing operation, the power management processor 45 produces an interrupt request on the bus 12 (see the division A). The interrupt controller 26 detects this interrupt and reports it to the BIOS. The BIOS searches for the source that generated the interrupt request and detects that the interrupt originated at the power management processor 45. With the result as a trigger, the right to control the system 100 is transferred to the PM (power management) program, and the suspend routine starts.

In the suspend routine, first, a check is performed to determine whether or not there is any I/O device activity (step S10). When such activity exists (e.g., a DMA transfer is being performed), the check for the presence of I/O activity is again performed after a certain period (e.g., 10 msec) has elapsed. Program control goes on standby until no I/O device activity is detected.

When no I/O device activity is detected, the PM program saves hardware context data in the main memory 13 (step S12). Then, VRAM original data are saved in the main memory 13 (step S14). Specific examples of hardware context data are the register values of individual chips, such as the MPU 11, the interrupt controller 26, the DMA controller 25 and the video controller 16, and the count values for the timers. The hardware context data and the VRAM data are required in order for a task to be resumed at the same point as when entering suspend mode.

Consecutively, the PM program time-stamps real time ($T_1$) of the RTC 28 at this point into a predetermined area of the main memory 13 (step S16).

When the data storing and time stamping are completed, the PM program requests the power management processor 45 to halt the power supply across specific power feed lines (power feed lines other than $V_{CC5A}$). Upon the receipt of this request, the power management processor 45 alters the contents of the bit cells in the power control register 46. In this manner, the power supply to the electric circuits, except for the main memory 13, is halted and the suspend routine is thereafter terminated (step S18).

(2) Resume routine

During the suspend mode, the power management processor 45 is activated periodically and examines whether there is any input (or a resume request) entered via the keyboard 30 or the mouse 31. When there is a input, at step S18, the power supply across the power feed lines is restarted (step S20). Then, the MPU 11 executes the POST program in the ROM (step S22).

When the POST program has been executed, the right to control the system 100 is transferred to the PM program, and thus the resume routine is begun.

In the resume routine, first, real time ($T_2$) of the RTC 28 at this point is time-stamped in a predetermined area of the main memory 13 (step S22).

At step S30, the time interval ($\Delta T$) between the time-stamping at step S16 and S22 is calculated. In accordance with the time interval $\Delta T$, the predetermined time $T_{SUS}$ of the suspend timer is changed. Two methods for altering the predetermined time $T_{SUS}$ are provided in this embodiment, and the following divisions D-2 and D-3 should be referred to detailed explanations of them.

The PM program restores the VRAM original data and the hardware context data, which are saved in the main memory, to the original locations (steps S26 and S28).

After restoring the necessary data, the system 100 becomes almost the same state as just before entering the suspend mode, and can resume the task at the point where it was halted.

In accordance with new predetermined time $T_{SUS}$, which was altered at step S30, the suspend timer counts the elapsed time since a last user input or a last processing operation of the system 100. Each time when the system 100 enters the suspend mode and then resumes a task, the set time $T_{SUS}$ of the suspend timer is accordingly updated. It will be obvious as is mentioned in the latter that the dynamic update of the power management timer satisfies the requests for both power management and useability.

D-2. Change of Set Time for Suspend Timer (First Example)

Figure 5:
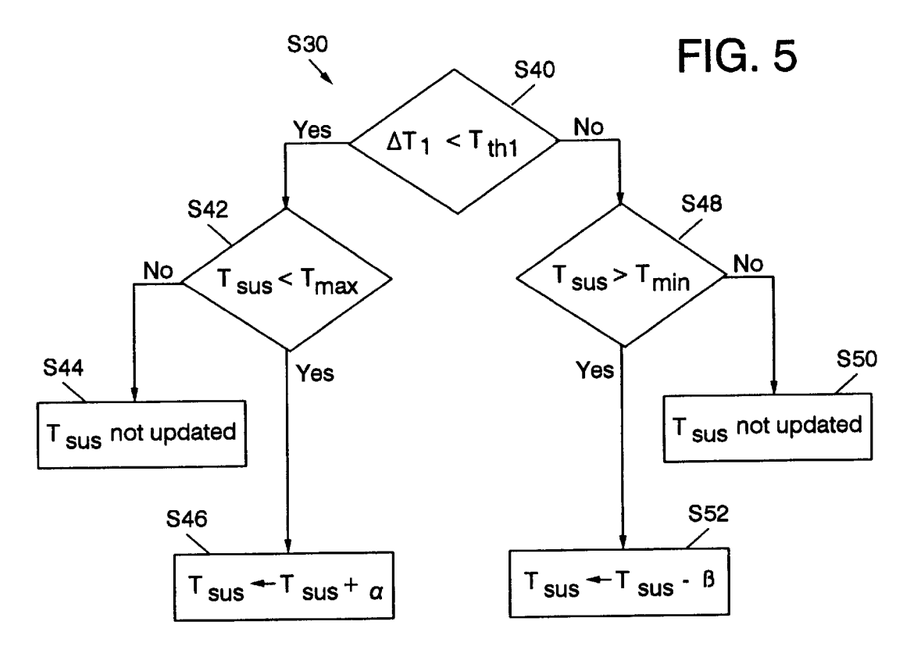
FIG. 5 is a diagram showing a first example for a method (step S30 in FIG. 4) for altering a time interval that is set for a suspend timer.

FIG. 5 is a flowchart showing a first example method for altering the set time $T_{SUS}$ of the suspend timer (i.e., the example of the procedure at step S30 in FIG. 4). In this example, the predetermined time $T_{SUS}$ is updated in consonance with the time interval $\Delta T_1(=T_2-T_1)$ from a point when the system 100 enters the suspend mode to a point when a request for resuming the task is generated.

First, at step 40, a check is performed to predetermine whether or not the time $T_1$, which extends from a point when the system 100 enters the suspend mode to a point when the resume request is generated, is greater than a given reference value $T_{th1}$ or not. The reference value $T_{th1}$ may be an average time interval that the suspend mode continues, or may be a value that is obtained according to the empirical rule.

When the time $\Delta T_1$ is smaller than the reference value $T_{th1}$, it means that a resume request has been generated at a relatively early time after entering the suspend mode. When the mode transition to the suspend is against user's will, the user tends to immediately input a resume request. In this case, therefore, since it is probable that the timing $T_{SUS}$ at which the system 100 enters the suspend mode is short for the user and the useability is degraded, the value $T_{SUS}$ must be changed to a greater value.

Before the updating of the $T_{SUS}$, the $T_{SUS}$ is compared with $T_{max}$ (step S42). The $T_{max}$ is the allowable maximum value for the time interval that is set for the suspend timer, and with a greater value than this, the power management effect of the system 100 must be considerably damaged. Therefore, when the $T_{SUS}$ is equal to or greater than $T_{max}$, the $T_{SUS}$ is not updated (step S44). When the $T_{SUS}$ is smaller than $T_{max}$, the $T_{SUS}$ is incremented by a predetermined value a (step S46).

When the $\Delta T_1$ is greater than the reference value $T_{th1}$, it means that neither user input nor processing operation of the system 100 has been detected for an extended period of time and no action affects the system 100. Since it is probable that the timing $T_{SUS}$ at which the system 100 enters the suspend mode is too long and the power management effect is thereby degraded, the value $T_{SUS}$ must be changed to a smaller value.

Before the updating of the $T_{SUS}$, the $T_{SUS}$ is compared with $T_{min}$ (step S48). The $T_{min}$ is the allowable minimum value for the time interval that is set for the suspend timer, and with a smaller value than this, the power management effect of the system 100 could not be maintained.

Therefore, when the $T_{SUS}$ is equal to or smaller than $T_{min}$, the $T_{SUS}$ is not updated (step S50). When the $T_{SUS}$ is greater than $T_{min}$, the $T_{SUS}$ is decremented by a predetermined value β (step S52).

With the above method, the time predetermined as the suspend timer can be dynamically altered in accordance with the work habits of a user, and more optimal power management can be provided.

The above described increment value α and decrement value β may be values that are obtained according to the empirical rule. To obtain a greater effect, if a period required for entering the power management mode or a period required for returning to normal mode (i.e., the delay time for power management) is relatively long, these values α and β should be predetermined so that the period before the mode transition to the power management mode is as long as possible (i.e., the value α should be predetermined to a large value and the value β should be predetermined to a small value). If a period required for power management operation is relatively short, these values should be predetermined so that the mode transition to the power management mode tends to easily occur.

D-3. Change of Set Time for Suspend Timer (Second Example)

Figure 6:
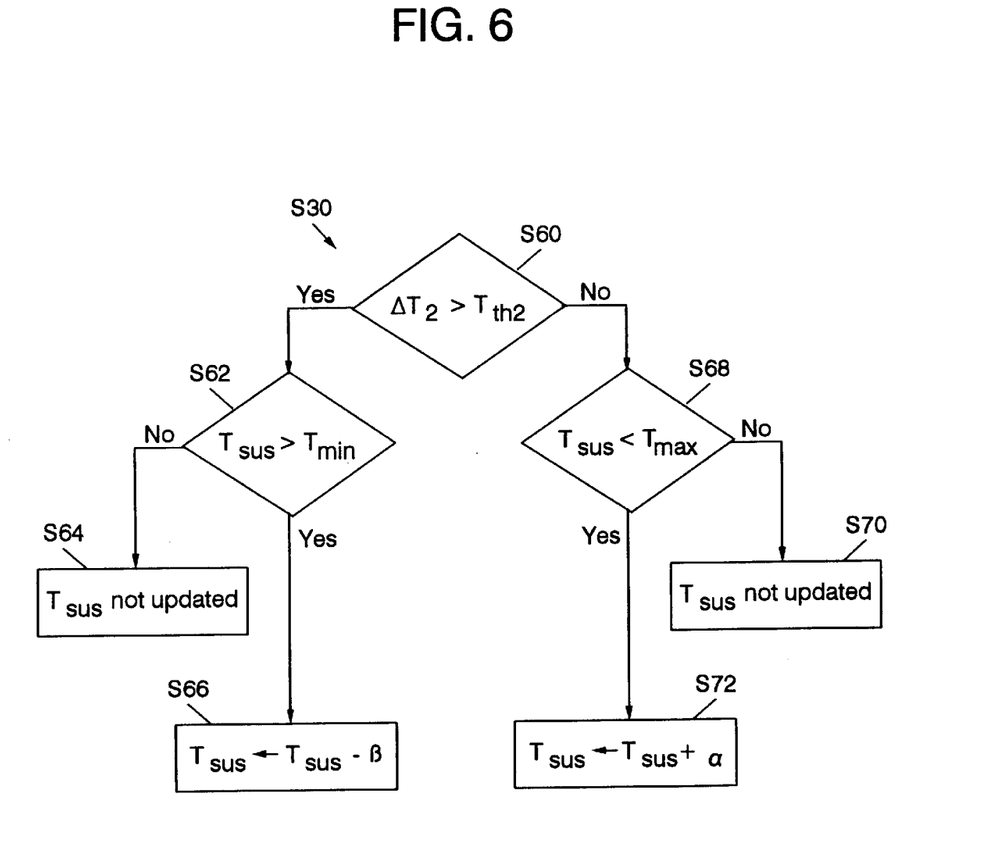
FIG. 6 is a diagram showing a second example for a method (step S30 in FIG. 4) for altering a time interval that is set for a suspend timer.

FIG. 6 is a flowchart showing a second example method for altering the set time $T_{SUS}$ of the suspend timer (i.e., the example of the procedure at step S30 in FIG. 4). In this example, the set time $T_{SUS}$ is updated in consonance with time interval $\Delta T_2$ (i.e., a period for one input job by a user) that extends from when the power supply starts to when the system 100 enters the suspend mode. $\Delta T_2$ can be acquired as the difference between real time $T_{2,i}$, the point at which the system 100 is resumed at the ith time, and real time $T_{1(I+1)}$, the point at which the system 100 enters the suspend mode at the: (I+1)th time.

First, at step 60, a check is performed to determine whether or not the time $T_2$, which extends from the point at which the system 100 resumes from the suspend mode to the point at which the system 100 enters the suspend mode again, is greater than a given reference value $T_{th2}$. The reference value $T_{th2}$ is an average period of time that is required for a sequence of user input operation, and may be a value that is obtained according to the empirical rule.

When the $\Delta T_2$ is greater than the reference value $T_{th2}$, it means that the input operation by a user continued for a relatively long time. It is expected that a user will be tired from the long input operation, and that the next input operation will be continued for a relatively short time. Therefore, the time predetermined as the suspend timer is altered to a smaller value to obtain a greater power management effect with preventing the degrading of useability.

Before the updating of the $T_{SUS}$, the $T_{SUS}$ is compared with $T_{min}$ (step S62). The $T_{min}$ is allowable the minimum value for the time interval that is predetermined as the suspend timer (as described above). When the $T_{SUS}$ is equal to or smaller than $T_{min}$, the $T_{SUS}$ is not updated (step S64). When the $T_{SUS}$ is greater than $T_{min}$, the $T_{SUS}$ is decremented by a predetermined value β (step S66).

When the time $\Delta T_2$ is greater than the reference value $T_{th2}$, it means that the current input operation has been terminated within a short time and thus a user will be refreshed and will continue the next input operation for a relatively long time. Therefore, the time predetermined as the suspend timer is altered to a relatively greater value to prevent the degrading of useability.

Before the updating of the $T_{SUS}$, the $T_{SUS}$ is compared with $T_{max}$ (step S68). The $T_{max}$ is the allowable maximum value for the time interval that is predetermined as the suspend timer (as described above). When the $T_{SUS}$ is equal to or greater than $T_{max}$, the $T_{SUS}$ is not updated (step S70). When the $T_{SUS}$ is smaller than $T_{max}$, the $T_{SUS}$ is incremented by a predetermined value α (step S72).

The increment value α and the decrement value β in the division D-3 are acquired according to the empirical rule, as well as in the division D-2. To obtain greater effects, these values are set according to a delay time caused by power management operation.

Although the suspend operation has been explained as an example in the division D, the dynamic alteration of the power management timer can be applied for other power management operations, such as the LCD-off or the MPU speed slow-down operation.

In this embodiment, an explanation is given with the premise that a PM program that executes the series of power management operations is included in the operating system The present invention is not limited to this mode, a software module that has an equivalent function as that of the PM program may be included in a different mode. For example, such a program may be coded and stored in the ROM 15.

The present invention has been described in detail while referring to the specific embodiment. However, it should be obvious to one having ordinary skill in the art that various modifications or revisions of the embodiment are possible within the scope of the present invention. The present invention can be applied for a variety of electric/electronic systems that require power management: facsimile machines; various cordless devices, such as portable radio terminals, cordless telephones, electronic notebooks and video cameras; and word processors. That is, although the present invention has been disclosed by using an example, it should not be limited to that example. To understand the scope of the present invention, reference should be made to the claims the claims should be referred to.

The present invention recognizes that when the mode transition to the power management mode is against user's will, the user wishes to recover the normal operation within a relatively short period of time after entering the power management mode. That is, according to an information processing system and a control method therefor of these aspects, when user input or the system operation of the system 100 is resumed relatively early after entering the power management mode, it is assumed that a user probably feels that the time interval that is predetermined as a power management timer is too short and provides inferior operability, and the time interval for the power management timer is altered so that the next time it is longer. When the period from the point entering the power management mode to a user input (or the next operation) is long, the mode transition to the power management mode is assumed to be satisfactory for the needs of a user, or a system, and the mode transition should be earlier to increase the power management effect. Accordingly the predetermined time interval for the power management is shortened.

As is described above, according to the present invention, provided are an information processing system that has a power management function, such as suspend, and that learns the work habits of a user and dynamically alters a power management timer, and a control method therefor. It is therefore possible to maintain a balance between useability and power management, and to substantially increase the total performance of the system.

What is claimed is:

1. An information processing system of the type which has at least one user input device to respond to user actuation and which has a power management mode of operation and a timer to cause the system to enter the power management mode when the system is operating and a predetermined time has elapsed without user input, which power management mode is exited to a normal operating mode upon occurrence of user input, wherein said timer alters the length of said predetermined time in accordance with the time interval that occurs between entering said power management mode and the next user input causing recovery to normal mode and then further adjusts such predetermined time according to the amount of time the system remains in the normal mode.

2. An information processing system according to claim 1 wherein the predetermined time is selectively reduced as the time in normal mode increases.

3. A control method for an information processing system of the type which begins operation in a normal operating mode, receives user input from an input device, leaves normal mode and enters a power management mode when a predetermined time has elapsed since a last user input in normal mode and then returns to normal mode upon a user input, comprising the steps of:

measuring a time interval that extends from entering said power management mode to a next user input causing recovery to normal mode;

comparing said time interval with a reference value that is predetermined; and altering said predetermined time to a greater value when said time interval is smaller than a reference value and also selectively changing the predetermined time based upon the accumulated time in the normal mode.

4. A control method according to claim 3 where a longer time in the normal mode selectively decreases the reference value.

\* \* \* \* \*